United States Patent Office 3,567,788
Patented Mar. 2, 1971

3,567,788
PREPARATION OF FLUORINE-CONTAINING COMPOUNDS
Russell L. K. Carr, Grand Island, N.Y., and Charles F. Baranauckas, Edina, Minn., assignors to Hooker Chemical Corporation, Niagara Falls, N.Y.
No Drawing. Continuation-in-part of abandoned applications, Ser. No. 161,255, Dec. 21, 1961, and Ser. No. 263,071, Mar. 5, 1963, which in turn is a continuation-in-part of application Ser. No. 161,255, Dec. 21, 1961. This application July 25, 1967, Ser. No. 655,744
Int. Cl. C07c 17/20, 21/18, 23/02
U.S. Cl. 260—648                                    10 Claims

ABSTRACT OF THE DISCLOSURE

Compounds of the formulas

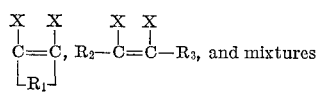

of these, wherein the R's are perhalogenated hydrocarbon radicals and the X's are halogens, are fluorinated with an alkali metal fluoride in an inert polar organic solvent, such as dimethylformamide or dimethyl sulfoxide.

This application is a continuation-in-part of our previous application, S.N. 161,255, filed Dec. 21, 1961, and S.N. 263,071, filed Mar. 5, 1963, both of which applications have been abandoned, which latter application was a continuation-in-part of said S.N. 161,255.

This invention is concerned with a process for the preparation of fluorine containing compounds. More specifically, the present invention relates to a novel fluorination for the preparation of perfluoro-olefins and halofluoroaliphatic and alicyclic compounds.

The process of the present invention is illustrated by the following general equations:

(I)
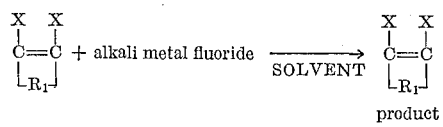

(II)
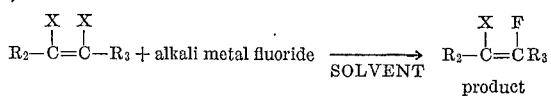

wherein the substituent $R_1$ is a divalent perhalogenated hydrocarbon radical, the substituents $R_2$ and $R_3$ are monovalent perhalogenated hydrocarbon radicals, and wherein the substituents on $R_1$, $R_2$, and $R_3$ are selected from the group consisting of bromine, chlorine, fluorine, iodine, and mixtures thereof, said fluorine comprising at least 50 percent of the total number of halogen substituents on each individual $R_1$, $R_2$ and $R_3$ radical, and X is a substituent selected from the group consisting of bromine, chlorine, fluorine, iodine, and mixtures thereof.

Examples of compounds considered to be typical of the starting materials of this invention include the following, it being understood that the list is illustrative only, and is not intended to be limiting or exhaustive.

| | |
|---|---|
| 1,2-dichlorohexafluorocyclopentene | (I) |
| 1,2,3-trichloropentafluorocyclopentene | (I) |
| 1,2,4-trichloropentafluorocyclopentene | (I) |
| 1,2-dichlorooctafluorocyclohexene | (I) |
| 1-chloroheptafluorocyclopentene | (I) |
| 1-chlorononafluorocyclohexene | (I) |
| 2,3-dichlorohexafluorobutene-2 | (II) |
| 2-chloroheptafluorobutene-2 | (II) |
| 1,2,3-trichloropentafluorobutene | (II) |
| 1,2,3,4-tetrachlorotetrafluorobutene-2 | (II) |
| 1-(3-choloroctafluorocyclopentyl)-2,3,4-trichlorohexafluoropentene-2 | (II) |
| 1,2,3-trichloro-3,4,5,5-tetrafluoro-4-(2-chlorotetrafluoroethyl)cyclopentene | (I) |
| 3-chloroundecafluorohexene-2 | (II) |
| 1,2-dichloro-3-trifluoromethylpentafluorocyclopentene | (I) |
| 1-bromo-2-chloro-4-pentafluoroethyl-heptafluorocyclohexene | (I) |
| 3-bromo-1-chloro-4-nonafluorobutylpentafluorocyclopentene | (I) |
| 2-bromo-3-chlorohexafluorobutene-2 | (II) |
| 2,5-dibromooctafluoropentene-2 | (II) |
| 2,3-dichloro-3,3,4,5,5,6,6,7,7,8,8,9-dodecafluoro-3,4,0-bicyclo-2-nonene | (I) |
| 2,3-dichloro-1,1,4,4,5,6,7,8-octafluoro-1,4-dihydronaphthalene | (I) |

As will be evident from the list of compounds given above, the perhalogenated cyclic hydrocarbons which are starting materials are usually of 5 to 9 carbon atoms, most preferably 5 or 6 carbon atoms in the ring, and the perhalogenated aliphatic hydrocarbons are usually of 4 to 11 carbon atoms, preferably of 4 to 6 carbon atoms in the ring.

The alkali metal fluoride is usually potassium fluoride but other suitable alkali metal fluorides may also be employed.

The solvent for the reaction is inert to the fluorination and does not interfere therewith. It is a highly polar organic solvent so that both the organic and inorganic reactants are soluble therein, to promote the fluorination reaction. Because the polar solvent is inert (not consumed) in the reaction, various equivalent solvents, having properties like those of the preferred di-lower alkyl formamides, di-lower alkyl sulfoxides and N-lower alkyl pyrrolidones, and usually having dipole moments like theirs or in the range of theirs, may be used.

The compounds of the present invention are prepared by a novel process which comprises reacting compounds of the general formula:

and mixtures thereof, wherein the substituents X, $R_1$, $R_2$ and $R_3$ are described herein, with an alkali metal fluoride in the presence of a solvent such as an inert organic carboxylic acid amide or a dialkyl sulfoxide solvent, to replace one or more halogen substituents with fluorine.

The following ranges, temperatures and conditions may be used in the process of this invention and should be the limits considered within the scope of this invention.

RANGES (1) Ratio of KF to halogen atom being replaced by F: 0.25:1 to 20:1, preferred 0.9:1 to 5:1.

(2) Weight of fluorinated reactant/weight of solvent: from about 10:1 to 1:5, preferred about 5:1 to 1:2.

(3) Temperature within about twenty-five degrees centigrade to about two hundred and fifty degrees centigrade would be preferred. Zero degrees centigrade to three hundred degrees centigrade would be the range within the scope of this invention. The preferred temperature range is from about 50 degrees centigrade to about 200 degrees centigrade.

(4) Pressures—near atmospheric preferred—superatmospheric can be used.

Illustrative examples of the solvents which may be utilized to accomplish the process of the present invention include N,N-di-lower fatty acid amide dimethyl formamide, diethyl formamide, N-methyl pyrrolidone, N,N-dimethylacetamide, dimethyl sulfoxide, and the like. It is appreciated that other solvents such as formamide, diethyl sulfoxide and so forth may be utilized without departing from the scope of the invention.

Any of the fluorides of the alkali metals, lithium, sodium, potassium, cesium and rubidium may be utilized. Of these, anhydrous potassium fluoride is preferred. Cesium fluoride, while more expensive, is usually more reactive. Sodium fluoride and lithium fluoride are less reactive and should have mechanical agitation to remove the coatings of sodium chloride or lithium chloride which form on the surfaces thereof.

Although the use of the preferred substantially anhydrous conditions results in the optimum yield of product, it has been found that substitution of vinylic chlorine atoms by fluorine occurs even in the presence of significant amounts of added water. 1,2-dichlorohexafluorocyclopentene was reacted with potassium fluoride in dimethyl formamide wherein water was added equal to about seventy-five weight percent of the potassium fluoride used. The distillate collected from the reaction was subjected to analysis by the use of infrared spectra and there was found beside the starting material, 1,2-dichlorohexafluorocyclopentene, also 1-chloroheptafluorocyclopentene.

The advantages of this process are in the ease and convenience with which more highly fluorinated or perfluorinated compounds, especially olefinic compounds, can be prepared. The use of pressure equipment is generally not required, nor is the use of highly elevated temperatures. Employment of relatively hazardous materials such as hydrogen fluoride, fluorine, halogen-fluorides, antimony halides and the like is eliminated since the fluorination is effected easily without these materials. A perhalogenated olefin in which the vinyl halogen atoms as well as other types of halogen atoms can now be converted easily and in one step to a perfluorinated olefin; recovered starting materials and intermediate halofluoroolefins can be recycled is desired. A novel concept of the present invention lies in the fact that perfluoroolefins can be readily synthesized without concomitant side reactions occurring wherein the double bond of the starting material is destroyed. Prior art methods require more elaborate techniques such as the use of relatively more expensive and corrosive fluorinating agents. In addition, these processes saturate the non-terminal double bond of the starting material with the elements of fluorine and must be followed by a dehalogenation step to remove the other halogens in order to generate the desired perfluoro-olefin. This is in contrast to the present invention wherein the non-terminal double bond of the original starting material is never destroyed and thus does not have to be regenerated by an additional chemical step. A reference to a prior art preparation of perfluoroolefins involving fluorination to saturate

then dehalogenating is: Henne, A. L., and Latif, K. A., J. Am. Chem. Soc. 76, 610 (1954). An example of this procedure can be found in the preparation of perfluorocyclopentene as illustrated in the following equation:

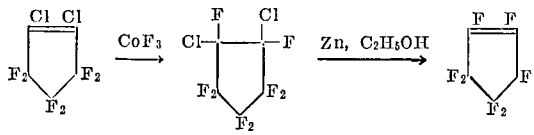

Perfluorinated or halogen containing fluorinated olefins are useful as monomers in the preparation of polymers and plastics, as refrigerants and as intermediates in the preparation of other materials. Polymers with a high fluorine content can be readily prepared by the homopolymerization of perfluorinated or highly fluorinated olefins such as the compounds of this invention or by the copolymerization of said olefins with other unsaturated compounds. In polymers of the above mentioned type, desirable physical and chemical properties such as chemical and solvent resistance and thermal stability, for example, can be more readily obtained than in polymers having no fluorine or having a relatively low fluorie content. Simons, J. H., & Brice, T. J., in "Fluorine Chemistry," vol. II, Academic Press, New York, 1954.

The process of the present invention may also be more specifically illustrated by the following equations:

(I)

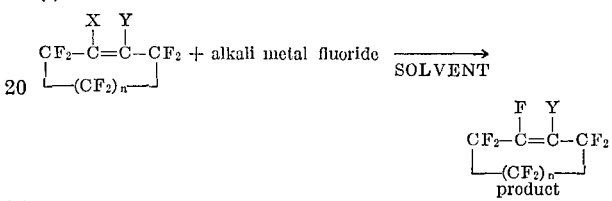

(II)

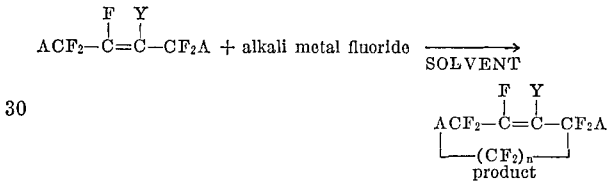

wherein the substituent X is selected from the group consisting of chlorine, bromine, and iodine, the substituent Y is selected from the group consisting of chlorine, fluorine, bromine, iodine and the substituent A is fluorine or a perfluoroalkyl radical and $n$ is an integer including 0. The perfluoroalkyl radical represented by A may have up to about 15 carbon atoms with the lower perfluoroalkyl radicals being preferred. The integer represented by $n$ may range from 0 to 10 with the preferred range being 0 to 2. It is appreciated that the substituent Y can also be hydrogen or a —$CF_3$ radical.

Typical illustrative examples of the process of this invention utilizing KF as the reactant and dimethyl formamide as the solvent (DMF) follow. When other highly polar solvents are used instead, comparable results are obtained.

(a)

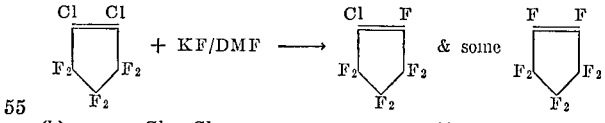

(b)

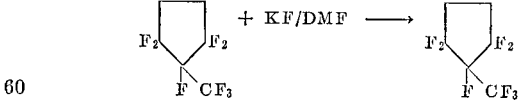

(c)

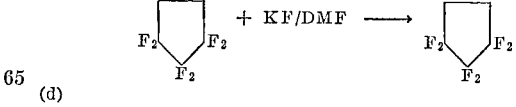

(d)

(e)

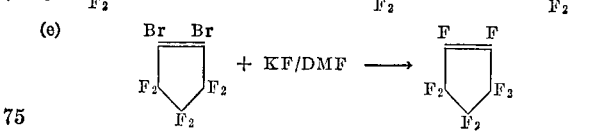

(f) $CF_3CCl_2CClCF_3 + KF/DMF \rightarrow CF_3CCl_2CF_2CF_3$ (g) $CF_3CCl=CClCF_3 + KF/DMF \rightarrow CF_3CCl=CFCF_3$ (h) $ClCF_2\equiv CCF_3 + KF/DMF \rightarrow CF_3C\equiv CCF_3$ (i) $CF_3CBr=CFCF_3 + KF/DMF \rightarrow CF_3CF=CFCF_3$ (j) $CF_3CCl_3=CClCF_3 + KF/DMF \rightarrow CF_3CF=CFCF_3$ (k) $CF_3CBr=CCl-CF_2-CF_2CCl_2CFBrCF_3$
    $+ KF/DMF \rightarrow CF_3CF=CF_2-CF_2CF_2CCl_2CF_2CF_3$ The following illustrative examples which are not limiting, will enable a person of ordinary skill in the art to practice the process of the invention.

EXAMPLE 1

To a three-necked, round-bottomed flask, equipped with a thermometer, an additional funnel, a mechanical stirrer, a Dean-Stark Barrett type moisture trap and condenser leading to a trap cooled in a Dry Ice acetone bath was added substantially anhydrous potassium fluoride (two hundred and eighty grams, 4.82 moles), and benzene (six hundred milliliters). Although the potassium fluoride was substantially water-free, a very small amount of water could have been present which was removed as the benzene azeotrope. Dimethyl formamide (four hundred milliliters), was then added to the flask and distillation was continued with stirring to remove benzene and any water which may have been present in the dimethyl formamide; the distillation was discontinued when the temperature of the body and the vapor were substantially the same, that is, about one hundred and fifty degrees centigrade. About seven hundred and thirty milliliters of distillate was collected; this included substantially all the benzene originally added as well as about one hundred and thirty milliliters of dimethyl formamide. The Dean Stark trap was replaced by a distilling head and receiver and additional dimethyl formamide (three hundred and thirty milliliters) was added to the reaction flask. After the addition of 1,2-dichlorohexafluorocyclopentene (three hundred and sixty grams, 1.47 moles), the mixture was refluxed with stirring for about eight and three-quarter hours during which time distillate, boiling point fifty-five to sixty degrees centigrade, was periodically removed. Distillate was then collected to a vapor temperature of about one hundred and fifty-three degrees centigrade, and all distillates and the Dry Ice trap contents were combined. Redistillation of this material yielded the following fractions: (1) one hundred and twenty-seven grams, boiling point twenty-nine to thirty-one degrees centigrade; (2) 44.5 grams, boiling point thirty-one to fifty-five degrees centigrade; (3) one hundred and ten grams, boiling point fifty-five to fifty-eight degrees centigrade; and (4) 11.5 grams of a residue. Fraction (1) proved to be substantially the known octafluorocyclopentene. (Analysis calculated for $C_5F_8$: percent C, 28.32; percent H, 0.00; Found: percent C, 28.04; percent H, 0.00); and fraction (2) was substantially the known 1-chloroheptafluorocyclopentene-1. The conversions to the perfluorocyclopentene and the 1-chloroheptafluorocyclopentene were about forty-eight percent and forty-one percent respectively; the yield of perfluoroolefin was about eighty-nine percent.

EXAMPLE 2

A procedure similar to that of Example 1 was followed with substantially anhydrous potassium fluoride (seventy grams, 1.2 moles), benzene (one hundred and fifty milliliters), dimethyl formamide (total volume one hundred and seventy milliliters) and 1,2-dichlorohexafluorocyclopentene (ninety grams, 0.37 mole) and with a reflux period of about four and one-half hours. Rectification of the distillate collected from the reaction mixture led to the recovery of about sixty to sixty-four grams of 1-chloroheptafluorocyclopentene for a yield of seventy-one to seventy-six percent.

EXAMPLE 3

To a three-necked, round-bottomed flask, equipped with a thermometer, an addition funnel, a mechanical stirrer, a Dean-Stark Barrett type moisture trap and condenser leading to a trap cooled in a Dry Ice acetone bath was added 93 grams of substantially anhydrous cesium fluoride (assayed 99.5 percent). Eighty milliliters of dimethyl formamide was then added to the flask. After the addition of 49 grams (0.2 mole) of 1,2-dichlorohexafluorocyclopentene, the mixture was refluxed with stirring for about four hours during which 50 additional milliliters of dimethyl formamide was added. The mixture was allowed to stand overnight. The mixture was then distilled during which time a distillate boiling point 24 degrees centigrade to 34 degrees centigrade was periodically removed. Infrared analysis revealed that 27 grams of octafluorocyclopentene

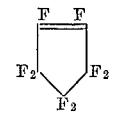

was collected and a small fraction of 1-chloroheptafluorocyclopentene

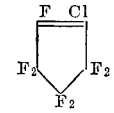

was also recovered.

EXAMPLE 4

To the reaction mixture and apparatus remaining from Example 1 (and containing residual potassium fluoride) was added 1,2-dichlorohexafluorocyclopentene (three hundred and ninety grams, about 1.55 moles). Heating was begun and distillate (boiling point sixty-five to seventy-five degrees centigrade), was collected as rapidly as possible during a period of about five hours. The distillate was washed with water, dried and redistilled to give about twenty-five grams of material boiling below thirty-five degrees centigrade (substantially octafluorocyclopentene), forty-five grams of an intermediate fraction and one hundred and fifty-three grams boiling at about fifty-six degrees centigrade. The conversions to octafluorocyclopentene and 1-chloroheptafluorocyclopentene were about nineteen and forty-eight percent, respectively.

EXAMPLE 5

1,2 - dichlorohexafluorocyclopentene (ninety grams, 0.37 mole), and substantially anhydrous potassium fluoride (seventy grams, 1.2 moles), were reacted in dimethyl formamide (one hundred and fifty milliliters) in a manner similar to Example 1 except that benzene was not used to remove any possible water present. The distillate which was collected was examined by infrared analysis and shown to be about eighty percent of the known 1-chloroheptafluorocyclopentene.

EXAMPLE 6

1,2-dichlorohexafluorocyclopentene (six hundred grams, 2.45 moles) and substantially anhydrous potassium fluoride (two hundred and eighty grams, 4.8 moles), were reacted in dimethyl formamide (two hundred milliliters) as in Example 4. After refluxing for about seventeen hours, distillate was collected up to a vapor temperature of one hundred and forty-five degrees centigrade. This material was then redistilled from a drying agent (predominantly calcium sulfate), to give ninety-four grams (boiling point twenty-eight to thirty-five degrees centigrade), sixty grams (boiling point thirty-five to fifty-six degrees centigrade), and three hundred and twenty-eight grams (boiling point fifty-six to fifty-nine degrees centigrade). Conversions to octafluorocyclopentene and 1-chlorononafluorocyclopentene were twenty-four and sixty-six percent respectively.

EXAMPLE 7

1,2 - dichlorohexafluorocyclopentene (ninety grams, 0.37 mole), and substantially anhydrous potassium fluoride (seventy grams, 1.2 moles), were reacted in dimethyl sulfoxide as in the manner of Example 4. There was obtained about fifty-seven grams of dry distillate which was analyzed by infrared to contain about seventy-four percent 1-chloroheptafluorocyclopentene and twenty-two percent recovered starting cyclopentene.

EXAMPLE 8

A procedure similar to that of Example 1 was followed with substantially anhydrous potassium fluoride (17.4 grams, 0.3 mole), benzene (fifty milliliters), dimethyl formamide (a total of fifty milliliters), and 1,2-dichlorooctafluorocyclohexene (29.5 grams, 0.1 mole) with a reflux period of about 23.5 hours. Rectification of the distillate led to the recovery of a total of nineteen grams of material. Of this, about 7.5 grams boiled from fifty-three to fifty-six degrees centigrade and had a refractive index of 1.297–1.298 at 20.5 degrees centigrade. This material by infrared analysis, was largely perfluorocyclohexene and contained a small amount of what is believed to be 1-chlorononafluorocyclohexene. The remaining 11.5 grams of material, boiling point fifty-six to seventy degrees centigrade, refractive index from 1.299 to 1.3102, also appeared to be a mixture of these two products.

EXAMPLE 9

2,3-dichlorohexafluorobutene-2 (ninety grams, 0.39 mole), and substantially anhydrous potassium fluoride (seventy grams, 1.2 moles), were reacted in dimethyl formamide (one hundred and fifty milliliters) as in Example 4. After refluxing for nine hours distillate was removed as in Example 1, which after washing and drying, weighed sixty-one grams. Analysis by infrared revealed that this distillate contained about eighty-three percent 2-chloroheptafluorobutene-2 and about fourteen percent recovered starting olefin.

EXAMPLE 10

A procedure similar to that of Example 1 was used with 1-chloroheptafluorocyclopentene (three hundred and twenty-eight grams, 1.43 moles), substantially anhydrous potassium fluoride (one hundred and sixty-five grams, 2.84 moles), dimethyl formamide (a total of four hundred and forty milliliters), and benzene (four hundred milliliters). After refluxing for about twenty hours and distilling the product out of the reaction, the distillate was refractionated to give about one hundred and twenty grams of octafluorocyclopentene for about a forty percent conversion; in addition about one hundred and thirty-eight grams of recovered 1-chloroheptafluorocyclopentene was recovered making the yield of perfluoroolefin about seventy-two percent.

EXAMPLE 11

2,2,3-trichloroheptafluorobutane (ninety grams, 0.32 mole), and substantially anhydrous potassium fluoride (seventy grams, 1.2 moles) were reacted in dimethyl formamide (one hundred and fifty milliliters) as in Example 5. The dried distillate weighed sixty-nine grams and comprised of ninety-five percent, 2,2-dichlorooctafluorobutane and three percent recovered heptafluorobutane as indicated by infrared analysis.

EXAMPLE 12

2,3-bichlorohexafluorobutene-2 (one hundred and twenty grams, 0.51 mole), potassium fluoride (substantially anhydrous, ninety-three grams, 1.94 moles), and dimethyl formamide (two hundred milliliters) were charged into a rocking autoclave and heated under autogenous pressure at sixty plus or minus five degrees centigrade, for about 23.5 hours. At the end of this time, the material was distilled out of the autoclave into an ampoule cooled in a Dry Ice acetone bath. The contents were transferred through a drying agent (as in Example 6), into a second ampoule, the weight of dried material was eighty-one grams. The infrared spectrum of the volatile material showed it to be almost entirely 2-chloroheptafluorobutene-2.

EXAMPLE 13

2,3-dichlorohexafluorobutene-2 (twenty-three grams, 0.1 mole), substantially anhydrous potassium fluoride (twenty-three grams, 0.4 mole), and N-methylpyrrolidone (forty milliliters) were charged into a heavy walled glass ampoule which was sealed and heated at one hundred and one to one hundred and eight degrees centigrade for about six hours and then at one hundred and forty-one to one hundred and fifty degrees centigrade for about five and three-quarter hours. The ampoule was then cooled in a Dry Ice acetone bath and opened. Upon warming, material distilled out of the tube which was condensed and collected. Examination of the infrared spectrum of the vapor of this condensate showed the presence of the known octafluorobutene-2 and the known 2-chloroheptafluorobutene-2.

In the above working examples, when other polar organic solvents, of those previously mentioned, such as diethyl formamide, dimethyl formamide, dimethyl sulfoxide, N-methyl pyrrolidone, N,N-dimethylacetamide and corresponding lower alkyl substituted homologues or analogues, are employed instead of the solvents specifically mentioned in the working examples, similar useful results are obtained.

Various changes and modifications may be made in the method and apparatus of this invention, certain preferred forms of which have been herein described, without departing from the spirit and scope of this invention. These modifications of this basic inventon are to be regarded as within the scope and purview of this nvention.
within the scope and purview of this invention.

What is claimed is:

1. A process for substituting fluorine for at least one other halogen in an unsaturated compound selected from the group consisting of

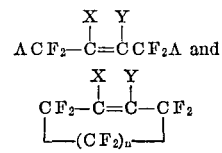

wherein X is selected from the group consisting of chlorine, bromine, and iodine; Y is selected from the group consisting of chlorine, bromine, iodine and fluorine; A is independently selected from the group consisting of fluorine and a perfluoroalkyl radical of up to about 15 carbon atoms and $n$ is an integer from zero to 10; which comprises heating said compound with an alkali metal fluoride in the presence of an inert solvent for the reactants of an N,N-di-lower alkyl lower fatty acid amide, at a temperature from about 60 to 200 degrees centigrade.

2. A process according to claim 1 wherein the unsaturated compound is 2,3-dichlorohexafluorobutene-2.

3. A process according to claim 1 wherein the unsaturated compound is 1,2-dichlorohexafluorocyclopentene.

4. A process according to claim 1 wherein the alkali metal fluoride is potassium fluoride.

5. A process according to claim 2 wherein the alkali metal fluoride is potassium fluoride.

6. A process according to claim 3 wherein the alkali metal fluoride is potassium fluoride.

7. A process according to claim 1 wherein the solvent is dimethyl formamide.

8. A process according to claim 5 wherein the solvent is dimethyl formamide.

9. A process according to claim 6 wherein the solvent is dimethyl formamide.

10. A process according to claim 1 wherein the reaction is carried out at a temperature of 70 to 160 degrees centigrade.

References Cited

UNITED STATES PATENTS 3,024,290   3/1962   Henne _____ 260—648F

OTHER REFERENCES

Finger et al., J. Am. Chem. Soc. 78, 6034–6037 (1956).

Henne et al., Abstracts of Papers of the 138th Meeting, Am. Chem. Soc., New York, N.Y., Sept. 11–16 (1960), p. 16M. Copy in P.O. Scientific Library.

Lovelace et al., Aliphatic Fluorine Compounds, p. 3 (1958), Reinhold Pub. Co., New York, N.Y. Call No. QD181F/L6 C.4.

DANIEL D. HORWITZ, Primary Examiner

U.S. Cl. X.R.

260—92.1, 653.3, 900

PO-1050
(5/69)

UNITED STATES PATENT OFFICE
CERTIFICATE OF CORRECTION

Patent No. 3,567,788          Dated   March 2, 1971

Inventor(s)   Russell L. K. Carr and Charles F. Baranauckas

It is certified that error appears in the above-identified patent and that said Letters Patent are hereby corrected as shown below:

Column 1, line 41, right-hand side of the formula, correct "X X" to read --X F--. Column 3, line 5: correct "lower fatty acid" to read --lower alkyl fatty acid--. Column 4, line 11: correct "low fluorie" to read --low fluorine--; line 26: correct "  F          " to read --   Y--; line 33: correct "$\underline{(CF_2)_n}$" to
          |                        |                                          Product       ---pr
       $ACF_2-C$                $ACF_2-C$ Column 5, line 3: correct "$ClCF_2\equiv$" to read --$ClCF_2C\equiv$ ; line 5: correc "$CF_3CCl_3=$" to read --$CF_3CCl=$ --. Column 7, lines 29 and 30: correct "seventy degrees" to read --seventy-three degrees--; line 72: correct "2,3-bichlorohexafluorobutene-2" to read -- 2,3-dichlorohexafluorobuter Column 8, line 40: delete.

Signed and sealed this 9th day of May 1972.

(SEAL)
Attest:

EDWARD M. FLETCHER, JR.          ROBERT GOTTSCHALK
Attesting Officer                Commissioner of Patents